Patented Jan. 17, 1928.

1,656,623

UNITED STATES PATENT OFFICE.

MELVIN DE GROOTE, OF ST. LOUIS, AND WILBUR C. ADAMS, OF UNIVERSITY CITY, MISSOURI, ASSIGNORS TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing. Application filed August 11, 1926. Serial No. 128,706.

This invention relates to the treatment of emulsions of mineral oil and water, such as petroleum emulsions, for the purpose of separating the oil from the water.

Petroleum emulsions are of the water-in-oil type and comprise fine droplets of natural occurring waters or brines dispersed in a more or less permanent state throughout the oil which constitutes the continuous phase of the emulsion. They are obtained from producing wells and from the bottoms of oil storage tanks and are commonly referred to as "cut oil", "roily oil", "emulsified oil" and "bottom settlings".

The object of our invention is to provide a novel process for breaking or separating such petroleum emulsions, which is distinguished from prior chemical processes heretofore used for breaking such emulsions, in that it contemplates subjecting the emulsion to the action of a treating agent consisting of a mixture comprising a condensation product containing a sulphonated hydroxy poly-cyclic aromatic chemically combined with a soap-forming radical.

The method employed to produce the treating agent used in our process is substantially the same as that employed to prepare a sulpho-aromatic soap-forming acid such as a Twitchell reagent. As is well understood in this art, the term "Twitchell reagents" is generally used to designate sulpho-aromatic soap-forming acids containing one soap-forming carboxyl group for each aromatic radical, and it is in this sense that we have herein used the term "Twitchell reagents".

In producing the treating agent contemplated by our process any suitable soap-forming material or detergent-forming material may be used, any suitable hydroxy poly-cyclic aromatic may be used and any preferred procedure may be employed to sulphonate the mixture, the expression "poly-cyclic aromatic" being herein used to mean an aromatic such as naphthalene or anthracene, and the expression "detergent-forming material" being herein used in a generic sense to indicate both modified and unmodified fatty bodies, rosins and naphthenic bodies, such as oleic acid, rosins, naphthenic acids and materials of the organic groups that are capable of combining with alkali to form soaps and which have the ability to form detergents even after modification by means of a chemical reagent, provided the modified substance bears a simple genetic relationship to the parent material from which it was derived. We have also herein used the term "sulpho-aromatic detergent-forming acid" to mean a body of acidic character having an aromatic radical and a sulphonic radical, and a detergent-forming radical of the kind previously noted, and have used the term "hydroxy aromatic" to mean a body containing an hydroxy group such as alpha naphthol, beta naphthol, di-hydroxy naphthalene, hydroxy anthracene, etc.

Although any soap-forming body, such as a fat, a rosin, or a naphthenic acid may be used in preparing the treating agent contemplated by our process, we prefer to use common oleic acid or red oil, due to the low cost and purity of the commercial product. It is immaterial what procedure is employed to combine the different materials or substances from which the treating agent is composed, but one convenient method of producing said treating agent consists in mixing substantially molecular proportions of red oil and beta naphthol, and thereafter sulphonating said mixture by means of excess sulphuric acid. The material resulting from this treatment is then washed so as to separate out most of the excess sulphuric acid, and it is then converted into an ester such as ethyl ester, or into a water-soluble salt, such as an alkali salt or ammonium salt. In manufacturing such a treating agent on a large scale some sulphonic acid and some di-sulphonic acid is produced, and moreover, there may be some uncombined fatty material and some uncombined aromatic sulphonic acid. However, there is a generous yield of the material previously described and the commerical product is a particularly effective treating agent for the resolution of the water in petroleum emulsions of the kind previously referred to.

As previously stated, the acidic materials of the compound can be converted into an ester, such as ethyl ester, it can be converted into a water-insoluble salt, such as calcium or magnesium salts, or it can be converted into a water-soluble salt, such as an alkali salt or an ammonium salt. Furthermore, said materials can be used alone or in combination with other suitable chemical treating agents and they can be used in diluted form or in undiluted form. When used in diluted form water or oil is the most desirable solvent to use.

In practicing our process the treating agent or compound above described is brought into contact with an emulsion either by introducing the treating agent into a well in which the petroleum emulsion is being produced; introducing the treating agent into a conduit through which a petroleum emulsion is flowing; introducing the treating agent into a tank in which a petroleum emulsion is stored, or introducing the treating agent into a container that holds sludge obtained from the bottom of an oil storage tank. The treating agent can even be introduced into a producing well in such a way that it can become mixed with water or oil that is emerging from the ground before said water and oil enter the barrel of the well pump or the tubing up through which said water and oil flow to the surface of the ground. After any of the various treatments above referred to the emulsion is allowed to stand in a quiescent state at a suitable temperature so as to permit the water or brine to separate from the oil, or it may be passed through a variety of apparatus, such as hay tanks, gun barrels, etc., such as are now commonly used for "breaking" petroleum emulsions. It may even be passed through a heating apparatus, a centrifugal or an electrical dehydrator, or an emulsifying device, with or without the addition of water to the emulsion, or it may be subjected to action by a combination of two or more of the devices above referred to.

Having thus described our invention, what we claim and desire to secure by Letters Patent is:

1. A process for breaking or separating petroleum emulsions, characterized by subjecting the emulsion to the action of a mixture comprising a condensation product containing a sulphonated hydroxy poly-cyclic aromatic chemically combined with a soap-forming radical.

2. A process for breaking or separating petroleum emulsions, characterized by subjecting the emulsion to the action of a mixture comprising a condensation product containing the salts of a sulphonated hydroxy poly-cyclic aromatic chemically combined with a soap-forming radical.

3. A process for breaking or separating petroleum emulsions, characterized by subjecting the emulsion to the action of a mixture comprising a condensation product containing the water-soluble salts of a sulphonated hydroxy poly-cyclic aromatic chemically combined with a soap-forming radical.

4. A process for breaking or separating petroleum emulsions, characterized by subjecting the emulsion to the action of a mixture comprising a condensation product containing the ammonium salts of a sulphonated hydroxy poly-cyclic aromatic chemically combined with a soap-forming radical.

5. A process for breaking or separating petroleum emulsions, characterized by subjecting the emulsion to the action of a mixture comprising a condensation product containing a sulphonated hydroxy aromatic radical chemically combined with a fatty group.

6. A process for breaking or separating petroleum emulsions, characterized by subjecting the emulsion to the action of a mixture comprising a condensation product containing the salts of a sulphonated hydroxy aromatic radical and a fatty group.

7. A process for breaking or separating petroleum emulsions, characterized by subjecting the emulsion to the action of a mixture comprising a condensation product containing the water-soluble salts of a sulphonated hydroxy aromatic radical chemically combined with a fatty group.

8. A process for breaking or separating petroleum emulsions, characterized by subjecting the emulsion to the action of a mixture comprising a condensation product containing the ammonium salts of a sulphonated hydroxy aromatic radical chemically combined with a fatty group.

9. A process for breaking or separating petroleum emulsions, characterized by subjecting the emulsion to the action of a mixture comprising a condensation product containing sulphonated naphthol chemically combined with modified oleic acid.

10. A process for breaking or separating petroleum emulsions, characterized by subjecting the emulsion to the action of a mixture comprising a condensation product containing the salts of sulphonated naphthol chemically combined with modified oleic acid.

11. A process for breaking or separating petroleum emulsions, characterized by subjecting the emulsion to the action of a mixture comprising a condensation product containing the water-soluble salts of sulphonated naphthol chemically combined with modified oleic acid.

12. A process for breaking or separating petroleum emulsions, characterized by subjecting the emulsion to the action of a mixture comprising a condensation product containing the ammonium salts of sulphonated naphthol chemically combined with modified oleic acid.

MELVIN DE GROOTE.
WILBUR C. ADAMS.